Feb. 8, 1927.

J. G. BURKE 1,616,844

SUPPORTING AND DRIVING CONSTRUCTION FOR GYRATORY GRINDING MILLS

Filed Oct. 24, 1924   2 Sheets-Sheet 1

Inventor.
James G. Burke
by Heard Smith & Tennant
Attys

Feb. 8, 1927. 1,616,844
J. G. BURKE
SUPPORTING AND DRIVING CONSTRUCTION FOR GYRATORY GRINDING MILLS
Filed Oct. 24, 1924 2 Sheets-Sheet 2
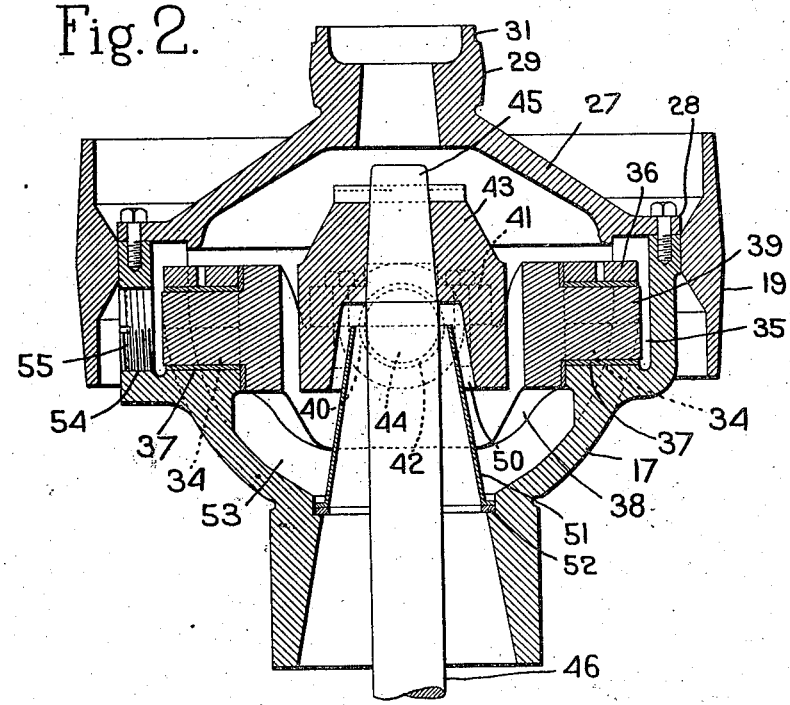
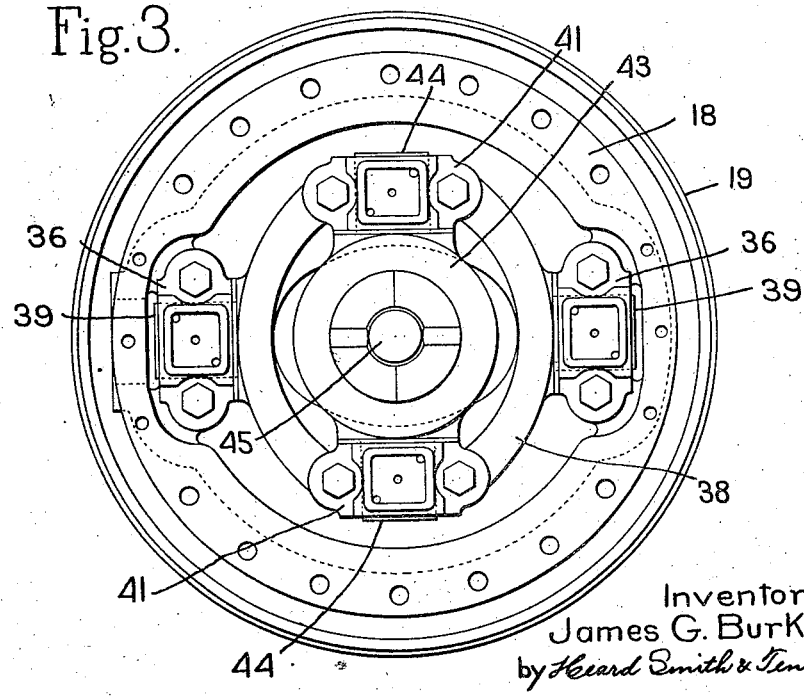
Inventor.
James G. Burke
by Heard Smith & Tennant.
Attys.

Patented Feb. 8, 1927.

1,616,844

UNITED STATES PATENT OFFICE.

JAMES G. BURKE, OF ALLENTOWN, PENNSYLVANIA, ASSIGNOR TO BRADLEY PULVERIZER COMPANY, OF ALLENTOWN, PENNSYLVANIA, A CORPORATION OF MAINE.

SUPPORTING AND DRIVING CONSTRUCTION FOR GYRATORY GRINDING MILLS.

Application filed October 24, 1924. Serial No. 745,553.

This invention relates to improvements in grinding mills of the type which comprises a grinding chamber having an annular die therein and a co-operating grinding roll the shaft of which is supported by a universal coupling upon a driving member in such a manner that the roll when rotated is given a gyratory movement to co-operate with the annular die.

This general type of mill is disclosed in and exemplified by Patents Nos. 1,095,986, granted May 5, 1914; 1,262,379, granted April 9, 1918; and 1,466,433 granted August 28, 1923, and the patents therein cited. In all of these constructions the universal coupling member which supports the shaft of the roll comprises upper and lower complementary casing members which are secured together and are provided with diametrically oppositely opposed ways which receive and guide segments pivotally mounted upon trunnions extending diametrically in opposite directions from a cross head which either supports the roll shaft or which supports the coupling casing and the roll shaft. In such constructions numerous wear plates are required which have to be very accurately machined. Furthermore, in each of these constructions bearing members having complementary spherical surfaces are provided to permit rocking movement of the cross head and these members must be of hardened material and present accurately machined co-operating surfaces.

The principal object of the present invention is to provide a mill of this type with a universal coupling of simplified construction having a minimum number of parts and in which the necessity for carefully machined wearing surfaces is avoided.

A further object of the invention is to provide a universal coupling of this character with novel means for insuring the proper supply of oil to the trunnion bearings.

Another object of the invention is to provide a universal coupling of this character with a simplified means for securing a pulley or other driving element thereto.

A further object of the invention is to provide a construction in which the bosses for the internal bearings of the coupling can be readily machined.

Other objects and features of the invention will more fully appear from the following description and the accompanying drawings and will be pointed out in the claims.

In the drawings:

Fig. 2 is an enlarged detail view in vertical section of the driving member in a plane at right angles to the section illustrated in Fig. 1; and, Fig. 3 is a plan view of the lower section of the driving member, the upper section being removed.

Figure 1:
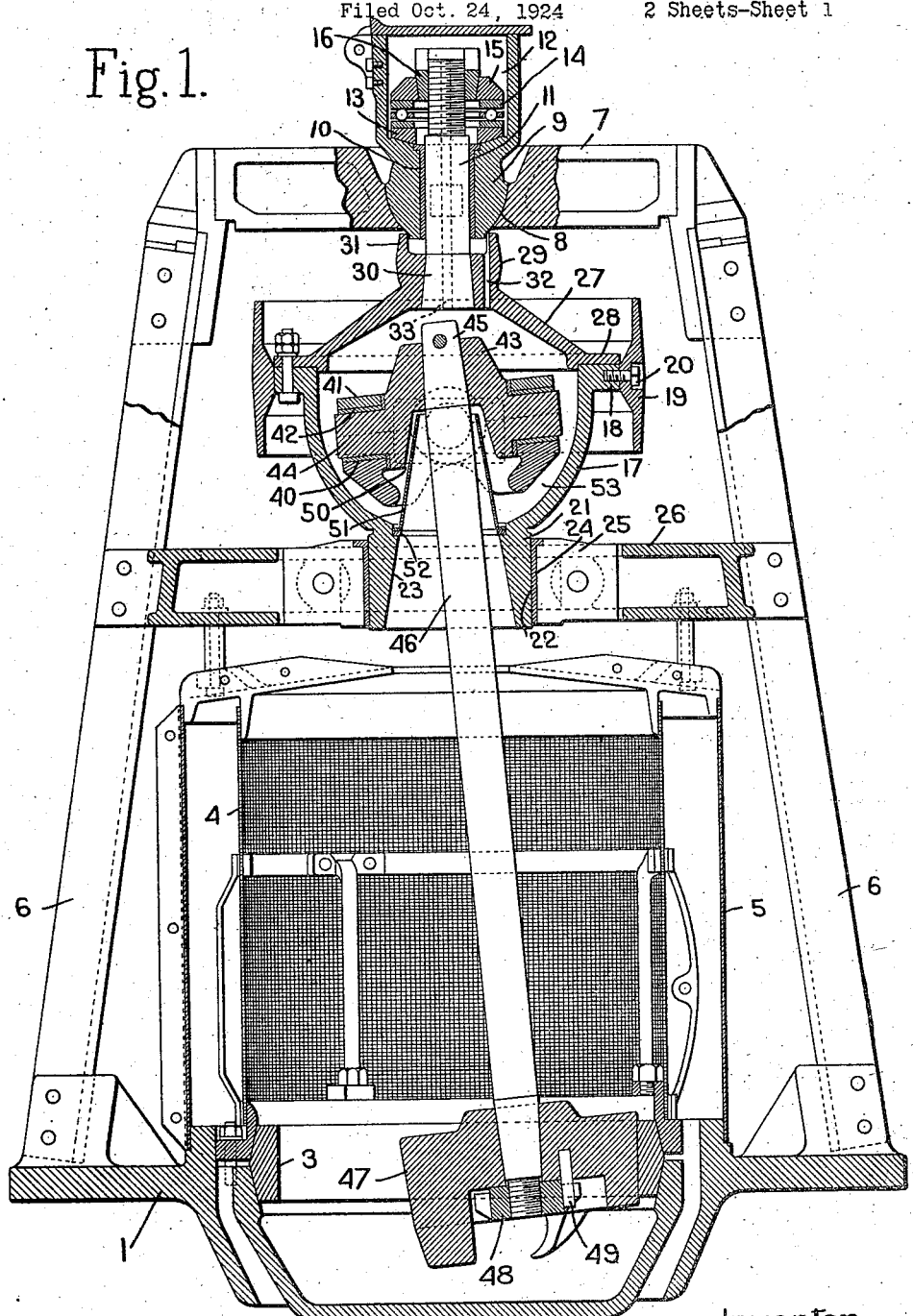
Fig. 1 is a vertical longitudinal sectional view through a grinding mill of the type above described embodying the present invention.

The grinding mill illustrated in the accompanying drawings is of the usual "Griffin" type comprising a base or body 1 having a pan 2 furnished with an annular die 3 above which is located an annular screen 4 and a surrounding annular casing 5. The roll supporting frame comprises a series of upwardly converging posts or legs 6 which are fixedly secured at their lower ends to the base 1 and at their upper ends support a girder 7 which is centrally provided with a spherical socket 8 which receives a complementary spherical bearing box 9 having a vertical bore provided with a bushing 10 for a supporting shaft 11. The bearing box 9 presents a cylindrical upwardly extending chamber 12 which constitutes the lubricant receptacle and the lower wall of the chamber desirably is spherical and forms a seat for a plate 13 having a complementary spherical lower surface and a flat upper surface upon which is mounted a ball bearing 14. An annular collar 15 engages the upper race of the ball bearing and is provided with a tapered central aperture which receives a nut 16 upon the screw threaded end of the shaft 9. The driving member and roll shaft are carried by the supporting shaft 11.

The roll shaft supporting and driving construction which contains the universal coupling for the roll shaft may be of any suitable character such as a pulley or gear. As illustrated herein the driving construction is in the form of a pulley having a hollow hub comprising a lower body portion 17 preferably of hemi-spheroidal form and provided at its upper end with a laterally extending flange 18 presenting a cylindrical outer peripheral wall upon which a pulley face 19 is mounted and secured by suitable bolts 20. The hollow hub 17 desirably is provided with a downward extension 21 having an outer cylindrical wall 22 and an upwardly converging conical inner wall 23, the outer wall 22 being rotatably mounted in a bushing 24 in a bearing 25 carried by a suitable cross girder 26 of the frame. The upper section 27 of the supporting and driving construction desirably is of conoidal form and is provided at its lower end with an outwardly extending flange 28 which is bolted to the flange 18 of the lower section. The conoidal member 27 is provided with an upwardly extending boss 29 having an upwardly converging aperture therethrough which receives and fits the lower conoidal end 30 of the supporting shaft 11.

Preferably the boss 29 has an upwardly extending annular flange 31 which surrounds the lower end of the spherical section 9 of the bearing box to receive such lubricant as may pass through the upper bearing and a duct 32 in said boss serves to conduct the oil from the chamber thus formed into the hollow hub of the supporting and driving construction. A duct 33, leading axially through the shaft 11, also provides means for supplying oil to the chamber of the hub.

The shaft of the gyrating roll is supported by a universal coupling located within the hub of the supporting and driving member. The principal object of the present invention, as heretofore stated, is to provide a simpler and more economical and efficient universal coupling having fewer parts and particularly omitting the numerous parts which have to be carefully machined and accurately assembled. In the preferred embodiment of the invention disclosed herein the body member 17 of the supporting and driving construction is provided with a pair of diametrically oppositely disposed apertured or recessed internal bosses 34 to provide trunnion bearings for the universal coupling which preferably are spaced a short distance from the inner wall of the driving and supporting member to provide oil pockets 35 at the ends of the trunnion bearings.

In the particular construction illustrated the wall of the body section of the supporting and driving member is somewhat bulged outwardly to permit the use of relatively wide bosses. The apertures in the bosses are of semi-cylindrical form and bearing caps 36 having complementary semi-cylindrical apertures are secured to the upper ends of the bosses. Suitable bushings 37 are provided to receive the ends of the trunnions.

The universal coupling comprises a cross head saddle 38 preferably of substantially elliptical form having trunnions 39 extending in the direction of the minor axis of the ellipse and seated in the trunnion bearings in the bosses 34. The cross head saddle is provided with diametrically opposite semi-cylindrical bearing recesses 40 extending in the direction of the major axis of the ellipse and the bearing is completed by caps 41 secured to the cross head saddle and provided with complementary semi-cylindrical recesses. The bearing thus formed is provided with suitable bushings 42. The roll shaft supporting cross head 43 is provided with diametrically oppositely extending trunnions 44 which are mounted in the bearings in the cross head saddle. The cross head 43 desirably is formed with an upper conical extension having an upwardly converging conical socket to receive the conical end 45 of the roll shaft 46 and the roll 47 is mounted upon the tapered lower end of the roll shaft and secured thereto by a nut 48 upon the screw threaded lower end of the roll shaft. The nut desirably is provided with a series of recesses to receive a locking pin 49 which is seated in the roll and which acts to prevent the nut from unscrewing. The under face of the cross head 43 desirably is provided with a conoidal recess 50 which extends well into the cross head. A conical sleeve 51 is secured to the lower portion of the inner wall of the supporting and driving member by an oil-tight joint 52 and extends upwardly well into the recess in the cross head. This sleeve desirably is of such conicity as to form an extension of the inner wall 23 of the downwardly extending bearing of the supporting and driving member and provides the inner wall of an oil chamber 53 of which the outer wall is formed by the concaved inner face of the spheroidal section 17.

In the operation of the machine rotation is imparted to the driving member by a belt in the construction illustrated herein or by suitable gearing as is well understood and the entire driving and supporting construction rotated upon the suspending shaft 11. The roll shaft is swung so that the roll will engage the annular die at the time the mill is started and from that time on centrifugal force will cause the roll to co-operate with the annular die, the universal coupling within the supporting and driving member permitting the roll thus to co-operate at all times. As the cross head saddle swings upon its trunnion bearings the trunnions of the cross head will dip into the oil in the oil chamber 53 and thus maintain the bearings of the cross head at all times in a good state of lubrication. The centrifugal force will also cause the oil to be thrown outwardly into the pockets 35 at the ends of the trunnion bearings upon which the cross head saddle is mounted and these pockets will retard the return of the oil to the oil chamber 53. Thus the bearings in which the trunnions of the cross head saddle are mounted will likewise be maintained in a proper state of lubrication at all times.

In order to provide for the boring or machining of the bearings in the bosses, and also to insure proper alinement of these bearings, the wall of the supporting and driving construction is provided with a recess 54 through which suitable tools may be entered to bore and finish the bearings. Thus the device may be placed in a jig and the bearings for the cross head trunnions bored in absolutely accurate alinement and properly finished. In accomplishing this purpose the caps for the bearings may be bolted to the bosses before the bearing recesses are bored. The aperture 54 is closed by a suitable plug 55 such as a screw threaded plug having threads engaging complementary threads in the wall of the aperture 54. The trunnion bearings in the supporting and driving member may be thus formed before the rim 19 of the pulley or other driving member is bolted to the cylindrical periphery of the flange 18 upon the driving and supporting member.

Thus it will be observed the supporting and driving member with its universal coupling is constructed of a minimum number of parts which can be readily and accurately made and quickly assembled and in which no specially machined parts are required.

It will be understood that the embodiment of the invention disclosed herein is of an illustrative character and is not restrictive and that various changes in form, construction and arrangement of parts may be made within the spirit and scope of the following claims.

Having thus described the invention, what is claimed as new, and desired to be secured by Letters Patent, is:

1. In a grinding mill of the class described comprising a frame, a rotatable driving member carried by said frame having a hollow hub provided with diametrically opposite bearings forming part of the hub structure and wholly enclosed therein, a cross head saddle within said hub having trunnions mounted in said bearings in said hub, a cross head having trunnions mounted in bearings in said cross head saddle at right angles to said saddle trunnions and a roll shaft suspended from said cross head.

2. In a grinding mill of the class described comprising a frame, a depending supporting shaft rotatably mounted therein, a rotatable driving member carried by said supporting shaft having a hollow hub and provided with a downward extension journalled in said frame, a cross head saddle within said hub having trunnions mounted in cylindrical bearings wholly enclosed within said hub and integral therewith, a cross head having trunnions mounted in bearings in said cross head saddle at right angles to said saddle trunnions and a roll shaft suspended from said cross head.

3. In a grinding mill of the class described comprising a frame, a rotatable driving member carried by said frame having a hollow hub, a cross head saddle within said hub having trunnions mounted in cylindrical bearings wholly enclosed within said hub and integral therewith, a cross head having trunnions mounted in bearings in said cross head saddle at right angles to said saddle trunnions and provided with a central recess, a sleeve extending from the lower portion of said hub into said recess to provide an oil chamber within said hub, and oil pockets at the ends of said saddle trunnions to receive oil thrown outwardly by centrifugal force and acting to retard the return of the oil to the oil chamber and a roll shaft suspended from said cross head.

4. In a machine of the class described, a roll shaft supporting construction comprising a body section having a hollow hub provided with internal alined cylindrical bearings wholly enclosed within said body section, a centrally apertured cross head saddle having trunnions mounted in said bearings and a shaft supporting cross head within the aperture in said saddle having trunnions mounted in bearings in said saddle at right angles to said saddle trunnions and a cap section secured to said body section.

5. In a machine of the class described, a roll shaft supporting construction comprising a body section having a hollow hub of generally hemi-spheroidal form, a pair of diametrically oppositely disposed apertured bosses within said hub spaced from the peripheral wall thereof providing trunnion bearings with an oil-receiving recess at the end of each bearing, an aperture in the hub wall in alinement with the apertures in said bosses to permit the insertion of means for boring said bosses to provide bearings, means for sealing said aperture, a cross head saddle having trunnions mounted in said bearings and a shaft supporting cross head having trunnions mounted in bearings in said saddle at right angles to said saddle trunnions.

6. In a machine of the class described, a roll shaft supporting construction comprising a body section having a hollow hub of generally hemi-spheroidal form, a pair of diametrically oppositely disposed apertured bosses within said hub providing trunnion bearings and spaced apart from the peripheral wall thereof, a hollow elliptical cross head saddle having trunnions extending outwardly thereform in the line of the minor axis of the ellipse and journalled in said bearings, trunnion bearings in said saddle located in the line of the major axis of the ellipse and a roll shaft supporting cross head having trunnions journalled in the bearings in said saddle.

In testimony whereof, I have signed my name to this specification.

JAMES G. BURKE.